US010727638B2

(12) United States Patent
Fuchs

(10) Patent No.: US 10,727,638 B2
(45) Date of Patent: Jul. 28, 2020

(54) ARRANGEMENT FOR ASSEMBLING CABLES

(71) Applicant: KOMAX HOLDING AG, Dierikon (CH)

(72) Inventor: Beat Fuchs, Ebikon (CH)

(73) Assignee: KOMAX HOLDING AG, Dierikon (CH)

( * ) Notice: Subject to any disclaimer, the term of this patent is extended or adjusted under 35 U.S.C. 154(b) by 315 days.

(21) Appl. No.: 15/684,201

(22) Filed: Aug. 23, 2017

(65) Prior Publication Data
US 2018/0069363 A1 Mar. 8, 2018

(30) Foreign Application Priority Data
Sep. 2, 2016 (EP) .................................. 16187059

(51) Int. Cl.
*H01R 43/052* (2006.01)
*H01R 43/05* (2006.01)
(Continued)

(52) U.S. Cl.
CPC .......... *H01R 43/052* (2013.01); *H01R 43/05* (2013.01); *H01R 43/28* (2013.01); *H01B 7/083* (2013.01); *H02G 1/005* (2013.01); *H02G 1/1253* (2013.01)

(58) Field of Classification Search
CPC ...... H01R 43/05; H01R 43/052; H01R 43/28; H02G 1/005; H02G 1/06; H02G 1/1253;
(Continued)

(56) References Cited

U.S. PATENT DOCUMENTS 4,561,155 A * 12/1985 Randar .................. H01R 43/01
29/33 M
5,765,278 A * 6/1998 Koike .................. H01R 43/055
29/33 M
(Continued)

FOREIGN PATENT DOCUMENTS

EP 1341269 A1 9/2003
EP 2442413 A1 4/2012
(Continued)

*Primary Examiner* — Sarang Afzali
*Assistant Examiner* — Darrell C Ford
(74) *Attorney, Agent, or Firm* — William J. Clemens; Shumaker, Loop & Kendrick, LLP

(57) ABSTRACT

An arrangement for assembling cables having cable processing devices arranged in parallel adjacent to one another wherein each cable processing device includes processing stations for processing cable ends of a cable, a cable conveying device running along a longitudinal machine axis for transporting the cable to at least one of the processing stations in the direction of the longitudinal machine axis, and a central control unit for operating the cable processing device which is arranged to a side of the cable processing device with respect to the longitudinal machine axis. The cable processing devices are arranged in at least one group with two adjacent cable processing devices, wherein due to a mirror-image configuration the central control units and the cable transport control units of the two adjacent cable processing devices forming the group are arranged facing and opposite one another to increase efficiency and ergonomics for an operator.

5 Claims, 2 Drawing Sheets

(51) Int. Cl.
*H01R 43/28* (2006.01)
*H01B 7/08* (2006.01)
*H02G 1/00* (2006.01)
*H02G 1/12* (2006.01)

(58) Field of Classification Search
CPC .............. Y10T 29/53; Y10T 29/53243; Y10T 29/53265; B65H 51/015; B65H 2701/341; H01B 7/083
USPC ......... 29/819, 700, 729, 771, 783, 791, 825, 29/828
See application file for complete search history.

(56) References Cited

U.S. PATENT DOCUMENTS

| | | | | |
|---|---|---|---|---|
| 5,960,622 A | * | 10/1999 | Koch | H01R 43/28 198/433 |
| 6,035,517 A | * | 3/2000 | Moore | H01R 43/28 174/481 |
| 10,476,244 B2 | * | 11/2019 | Blum | B65H 57/16 |
| 2003/0150106 A1 | * | 8/2003 | Ikeda | H01R 43/01 29/761 |
| 2005/0050713 A1 | * | 3/2005 | Locher | H01R 43/05 29/564.4 |
| 2006/0230597 A1 | * | 10/2006 | Rodriguez | H01R 43/28 29/564.4 |
| 2015/0340827 A1 | * | 11/2015 | Hallman | H01R 43/048 29/863 |
| 2016/0139590 A1 | * | 5/2016 | Agustoni | B25J 9/1602 700/122 |
| 2017/0129709 A1 | * | 5/2017 | Mazur | B65G 15/14 |
| 2019/0318850 A1 | * | 10/2019 | Ogino | H02G 1/1248 |
| 2019/0356099 A1 | * | 11/2019 | Lo | H01R 43/28 |

FOREIGN PATENT DOCUMENTS

| | | |
|---|---|---|
| EP | 2511213 A1 | 10/2012 |
| EP | 3024099 A1 | 5/2016 |
| JP | 2014116120 A | 6/2014 |

* cited by examiner

ARRANGEMENT FOR ASSEMBLING CABLES

FIELD

The invention relates to an arrangement for assembling cables with cable processing devices arranged in parallel adjacent to one another. During the assembly of cables, cable ends of cables are crimped or processed in some other manner. Due to an arrangement that comprises a plurality of cable processing devices, preferably of the same kind, arranged in parallel adjacent to one another, a plurality of assembled cables may be produced simultaneously with these cable processing devices. In parallel means that the longitudinal machine axes of the cable processing devices essentially run parallel to one another.

BACKGROUND

Arrangements for assembling cables with cable processing devices arranged in parallel adjacent to one another have been known and commonly used for quite some time. Such an arrangement is illustrated in FIG. 3, for example. The arrangement comprises four identically embodied cable processing devices 1 that are arranged in parallel adjacent to one another, each extending in a longitudinal machine axis x. The assembled cables are typically produced by lot, i.e. a total quantity is produced that can be stored in a cable receiving unit in the form of a storage tray 13 is produced from the same article, which comprises for instance a cable having bilaterally crimped contacts. During production of the article, the machine operator is busy, inter alia, with removing the lot with the fully assembled cables from the cable removal unit 13 and preparing it for further processing (e.g. placing or bundling it in a crate) and with monitoring the cable processing device. Once a lot has been removed, as a rule this must be acknowledged at the cable processing device 1 so that production of the next lot may begin. If an operator is looking after a plurality of cable processing devices 1 (for instance, four cable processing devices in this case), the operator must cover long distances. For instance, he must go around the cable processing device 1 in order to get to the next cable processing device 1. Cable containers (such as drums or coils) for a plurality of cables may be stored on the cable feed side of the cable processing devices, which adds additional distance to the path the operator has to travel.

SUMMARY

It is therefore an object of the present invention to avoid the disadvantages of the known arrangements and in particular to create an arrangement for assembling cables with which assembled cables may be produced more efficiently.

This object is achieved according to the invention with an arrangement having cable processing devices arranged in parallel adjacent to one another. Each cable processing device of these cable processing devices comprises the following components: at least one processing station, one cable conveying device, and one central operating unit. Processing stations that may be employed for processing cable ends of a cable may be, for instance, insulation-stripping stations, grommet stations, or crimping stations. The cable conveying device running along a longitudinal machine axis transports the cable in the direction of the machine longitudinal axis to at least one processing station. The processing stations are selectable and controllable, at least with respect to production operation, via the central control unit. A central control unit may have input means in the form of keys, buttons, switches, or computer mouse, and may have display means, for instance optical, acoustic, or haptic display means for displaying operating modes. The display means may be, for instance, a computer monitor or screen that assists the operator to obtain information on the operating modes rapidly. It is also possible to have touch-sensitive display surfaces (so-called "touchscreens") that also permit input. The central control unit is arranged to the side of the cable processing device relative to the longitudinal machine axis. Assembled cables may be mass-produced more efficiently since the cable processing devices arranged in parallel adjacent to one another has at least one group with two adjacent cable processing devices, wherein the central control units of the two adjacent cable processing devices forming a group are positioned such that they may be controlled from a common accessible region disposed between the two adjacent cable processing devices forming a group.

One aspect of the invention relates to an arrangement according to the above description, in which arrangement the central control units of the two adjacent cable processing devices forming a group are arranged facing one another and may be arranged opposite one another. An accessible region is disposed between the aforesaid two adjacent cable processing devices forming a group. The central control units of the aforesaid two cable processing devices may be operated from this common accessible region; due to the inventive arrangement, it is easy for the operator to operate two cable processing devices without traveling a time-consuming circuitous route. Thus the operator must essentially only turn about his own axis to switch between the control units. The arrangement is thus distinguished by overall improved handling and ergometry.

The cable conveying device may be controlled for certain work steps with a local cable transport control unit that is locationally separated from the central control unit. For instance, if a cable is to be supplied to the cable conveying device for the first time or if a cable change is necessary, such a cable transport control unit may be advantageous. During a cable change, the new cable is preferably initially conducted through an alignment station and then to the cable conveying device, which is embodied, for instance, as a conveyor belt. For conducting the cable through the conveyor belt, the operator may activate the conveyor belt by means of a key or other input means. If the cable processing devices have such cable transport control units that are preferably in the region of each cable conveyor device and are arranged to the side, with respect to the longitudinal machine axis, of the cable processing device, it is advantageous when the cable transport control units of the two adjacent cable processing devices forming a group also face one another and are preferably arranged opposite one another. It is particularly preferred that for each cable processing device the cable transport control unit is arranged to one side with respect to the longitudinal machine axis. In other words, for the particularly preferred arrangement, the cable processing devices would have cable transport control units arranged on one side (with respect to the longitudinal machine axis). Each cable processing unit having the cable transport control unit arranged to one side consequently has only one cable transport control unit, wherein the cable transport control unit is arranged to the side of the cable processing device with respect to the longitudinal machine axis.

If the cable processing devices furthermore have storage trays, for receiving processed cables, arranged to the side, with respect to the longitudinal machine axis, the processed cables each being arranged to the side of the cable processing device relative to the longitudinal machine axis, it is advantageous when the storage trays of the two adjacent cable processing devices forming a group also face one another and are preferably arranged opposite one another. Each cable processing unit having the storage tray arranged to one side consequently has only one storage tray, wherein the storage tray is arranged to the side of the cable processing device with respect to the longitudinal machine axis.

It is particularly advantageous when the two adjacent cable processing devices forming a group are essentially embodied in a mirror-image configuration. Due to the mirror-image arrangement of the two adjacent cable processing devices forming a group, mirror-image at least for the aforesaid control units (central control units, transport control units), possibly transport trays, the machine components to be operated or otherwise accessible for the operator, such as central control units, cable transport control units, and storage trays, are advantageously disposed opposite one another.

If the arrangement comprises a plurality of cable processing devices, it is advantageous to group the cable processing devices in pairs and to embody the cable processing devices combined into pairs in a mirror-image configuration.

DESCRIPTION OF THE DRAWINGS

Additional advantages and individual features of the invention are derived from the following description of an exemplary embodiment and from the drawings. Shown are.

DETAILED DESCRIPTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
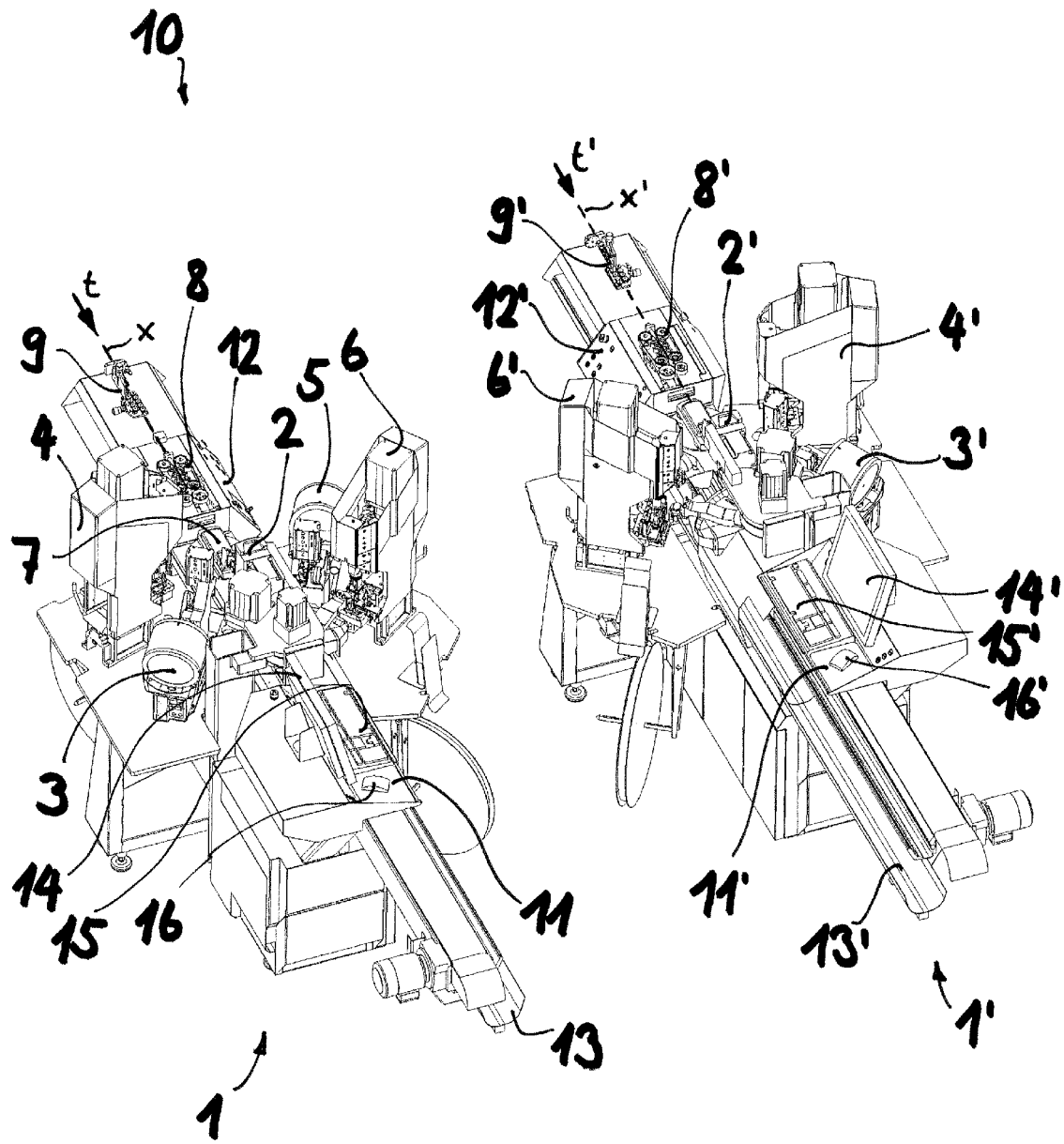
FIG. 1 is a perspective elevation of an inventive arrangement with two cable processing devices.

FIG. 1 depicts an arrangement 10 for assembling cables (not shown) having two cable processing devices 1 and 1' arranged in parallel adjacent to one another. The two cable processing devices 1 and 1' are identical apart from the different orientation, described in the following.

The two cable processing devices 1 and 1' have the same components. Each cable processing device 1, 1' comprises a feed unit having a cable conveying device 8, 8' that is embodied as a conveyor belt and moves the cable to the pivot unit 7, 7' along the longitudinal machine axis x, x' in the transport direction indicated by the arrow t, t'. An alignment 9, 9' is arranged upstream of the cable conveying device 8, 8'. The pivot unit 7, 7', which is rotatable about a vertical axis, has a gripper for holding the cable. As may be seen, a stripping station 2, 2' for cutting and stripping the cable is arranged on each longitudinal machine axis. In contrast, the processing stations 3, 3', 5, 5', and 4, 4', 6, 6' are arranged adjacent to the longitudinal machine axis. The processing stations labeled 3, 3', 5, 5' are grommet stations, and the processing stations labeled 4, 4', 6, 6' are crimping stations. A crimping station may have a crimping press for connecting a cable end to a crimp contact. The processing stations 3, 3' and 4, 4', are associated with the leading cable end; the processing stations 5, 5' and 6, 6' are used for assembling the trailing cable ends. Reference is hereby made, for example, to EP 1 341 269 A1 with regard to the structure and manner in which a cable conveying device operates with crimping presses. Additionally or alternatively, fitting stations for fitting cable ends with plug housings would also be possible. Each cable processing device 1, 1' furthermore has a storage tray 13, 13' for receiving processed cables.

Production on each of the cable processing devices 1, 1' is controlled and monitored via a central control unit 11, 11'. The central control unit 11, 11' is connected to a control via which the individual processing stations may be directed for the operation of the cable processing device 1, 1' for mass-producing assembled cables. The central control unit 11, 11' according to the exemplary embodiment in FIG. 1 comprises, for instance, a screen 14, 14', a computer keyboard 15, 15', and an associated mouse 16, 16'. The data relevant for production, such as item counts, quality data, and error messages, are displayed on the screen 14, 14'. Data and commands may be input to the machine control unit by means of keyboard and mouse. Naturally it would also be possible to design the screen as a touchscreen via which inputs could be added directly using the screen. In addition to the central control unit 11, 11', keys or other input means are present with which functions like starting and stopping the cable processing device 1, 1' or acknowledging finished lots may be initiated directly. A cable transport control unit 12, 12' that is arranged in the region of the cable conveying device 8, 8' is allocated to each cable processing device 1, 1', as well. As may be seen, each cable processing device 1, 1' has a cable transport control unit 12, 12' arranged to one side or only on the side with respect to the longitudinal machine axis x, x'. With the cable transport control unit 12, 12', the cable conveying device may, for instance, be controlled for initial insertion of a cable and for a cable change. For instance, if a cable is to be supplied to the cable conveyor device 8, 8' for the first time or if a cable change is necessary, such a cable transport control unit may be advantageous. For inserting and conducting the cable through the conveyor belt, the operator may activate the conveyor belt for the specific cable conveying device 8, 8' by means of a key or other input means.

The cable processing device labeled 1' is embodied in a mirror-image configuration to the cable processing device 1. This special arrangement means that, inter alia, the two central control units 11 and 11' and the two cable transport control units 12 and 12' are arranged opposite one another and facing one another. This permits the operator to operate the central control units 11, 11' and cable transport control units 12, 12' of two cable processing devices 1, 1' at approximately the same location or from a commonly accessible region that is disposed between the cable processing devices 1, 1'. In particular, the operator does not have to walk around any of the cable processing devices in order to move from one cable processing device to another. The same applies for the other components of the cable processing devices, such as for instance the two storage trays 13, 13'. As may be seen, like the cable transport control units 12, 12', the storage trays 13, 13' are each also arranged to one side of the cable processing devices 1, 1' with respect to the longitudinal machine axis x, x'. Due to the arrangement of the storage trays 13, 13' opposite and facing one another, it is not necessary for the operator to travel additional paths, which has a positive effect on the overall efficiency of the arrangement with the two cable processing devices 1, 1'. Thus the operator must essentially only turn about his own axis to switch between the individual control units 11 and 11' and 12 and 12'.

One advantageous embodiment could also result if, for example, the central control units 11 and 11' of the two adjacent cable processing devices 1, 1' forming a group are not arranged directly opposite one another, as depicted in FIG. 1, but instead are arranged offset to one another with respect to the longitudinal machine axes x, x'. In the aforesaid alternative arrangement (not shown), the control units 11 and 11' of the cable processing devices 1, 1' would be positioned such that they could be operated from a common region disposed to be accessible between the cable processing devices 1, 1'.

Figure 2:
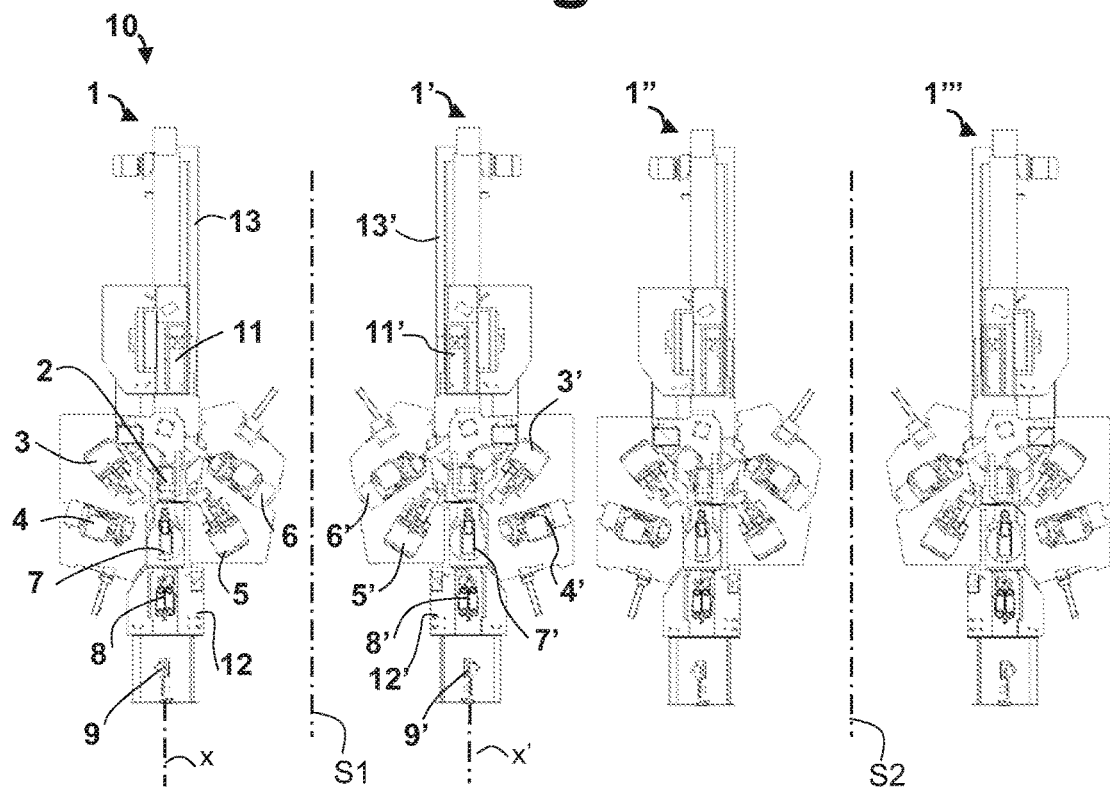
FIG. 2 is a top view of an inventive arrangement with four cable processing devices.
Figure 3:
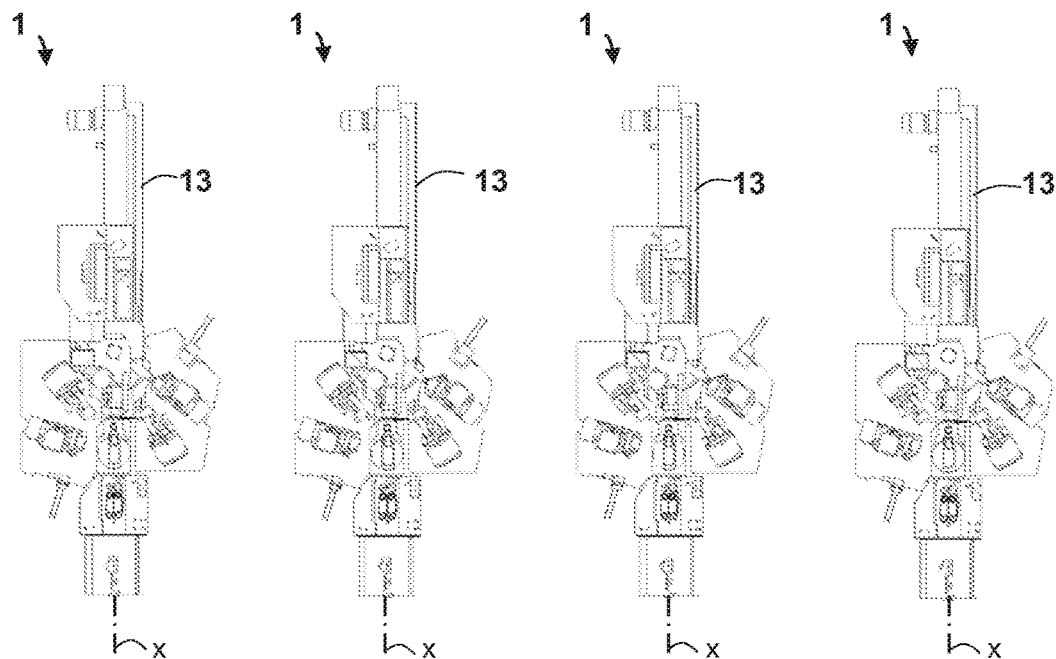
FIG. 3 is a top view of an arrangement with four cable processing devices according to the prior art.

FIG. 2 depicts a top view of an inventive arrangement 10 having four cable processing devices 1, 1', 1", 1'" with two groups being formed by cable processing devices as in FIG. 1. Each of the cable processing devices 1, 1', 1", 1'" is constructed identically and with the same components. The four cable processing devices 1, 1', 1", 1'" are grouped in pairs. The two cable processing devices 1 and 1' form a first group and the cable processing devices 1" and 1'" form a second group. The two groups are identically equipped. The cable processing devices 1 and 1' forming the first group are essentially embodied in a mirror-image configuration to one another; the cable processing devices 1" and 1'" are likewise embodied essentially in a mirror-image configuration to one another. The planes of symmetry are labeled S1 (for the first group having the cable processing devices 1 and 1') and S2 (for the second group having the cable processing devices 1" and 1'"). Compared to the conventional arrangement, depicted in FIG. 3, it may be seen that another advantage of the inventive arrangement is that the arrangement is distinguished by a smaller requirement for space. The transverse dimension (transverse to the longitudinal direction x) of the arrangement 10 (FIG. 2) is significantly smaller than the transverse dimension of the conventional arrangement (FIG. 3), since the cable processing devices may be placed closer to one another. Due to the mirror-image configuration and the resulting accessibility of the two cable processing devices 1 and 1', on the one hand, and of the two cable processing devices 1" and 1'", on the other hand, the cable processing devices 1' and 1" may be positioned with very little space between them, as is easily seen from FIG. 2. The region between the cable processing devices 1' and 1", i.e. the region between the groups of the cable processing devices 1, 1'; 1", 1'", therefore do not have to be provided continuously accessible with respect to the longitudinal direction through the longitudinal machine axes x, x'.

The arrangement depicted in FIG. 2 having the four cable processing devices 1, 1', 1", 1'" is merely an example for explaining the thought behind the invention. Naturally this arrangement could be expanded, as needed, by the analogous addition of additional groups of two cable processing devices.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An arrangement of assembling cables with cable processing devices arranged with longitudinal machine axes in parallel adjacent to one another, wherein the cable processing devices each include at least one processing station for processing cable ends of a cable, a cable conveying device running along the longitudinal machine axis of the cable processing device for transporting the cable in a direction of the machine longitudinal axis to the at least one processing station, and a central control unit for operating the cable processing device that is arranged to a side of the cable processing device with respect to the longitudinal machine axis, the central control unit having input means, the arrangement comprising:

the cable processing devices being arranged in parallel adjacent to one another in at least one group formed by two adjacent ones of the cable processing devices, the cable processing devices forming the at least one group being in a mirror-image configuration;

wherein the central control units of the adjacent cable processing devices forming the at least one group are positioned such that the input means of the central control units of the at least one group are accessible to and are operated by an operator from a common accessible region disposed between the two adjacent cable processing devices forming the at least one group;

wherein each of the cable processing devices has a cable transport control unit, and the cable transport units of the at least one group are arranged facing one another; and wherein the cable processing devices each have a storage tray for receiving processed cables, and the storage trays of the at least one group are arranged facing one another.

2. An arrangement for assembling cables with cable processing devices arranged with longitudinal machine axes in parallel adjacent to one another, wherein the cable processing devices each include at least one processing station for processing cable ends of a cable, a cable conveying device running along the longitudinal machine axis of the cable processing device for transporting the cable in a direction of the machine longitudinal axis to the at least one processing station, and a central control unit for operating the cable processing device that is arranged to a side of the cable processing device with respect to the longitudinal machine axis, the central control unit having input means, the arrangement comprises:

the cable processing devices being arranged in parallel adjacent to one another including a first group formed by two adjacent ones of the cable processing devices and a second group formed by another two adjacent ones of the cable processing devices, the first group being adjacent to the second group, the cable processing devices forming the first group being in a mirror-image configuration and the cable processing devices forming the second group being in a mirror-image configuration;

wherein the central control units of the two adjacent cable processing devices forming the first group are positioned such that the central control units of the first group can be controlled from a common accessible region disposed between the two adjacent ones of the cable processing devices, the first group being adjacent to the second group;

wherein the central control units of the two adjacent cable processing devices forming the first group are positioned such that the central control units of the first group can be controlled from a common accessible region disposed between the two adjacent cable processing devices forming the first group, such that the input means of the central control units of the cable processing devices forming the first group are operated by an operator from the common accessible region disposed between the two adjacent cable processing devices forming the first group; and wherein the central control units of the two adjacent cable processing devices forming the second group are positioned such that the central control units of the second group can be controlled rom another common accessible region disposed between the two adjacent cable processing devices forming the second group, such that the input means of the central control units of the cable processing devices forming the second group are operated by the operator from the common accessible region disposed between the two adjacent cable processing devices forming the second group.

3. The arrangement according to claim 2 wherein the central control units of the first group are arranged facing one another and the central control units of the second group are arranged facing one another.

4. The arrangement according to claim 2 wherein each of the cable processing devices has a cable transport control unit, the cable transport control units of the first group are arranged facing one another, and the cable transport control units of the second group are arranged facing one another.

5. The arrangement according to claim 2 wherein the cable processing devices each have a storage tray for receiving processed cables, the storage trays of the first group are arranged facing one another, and the storage trays of the second group are arranged facing one another.

* * * * *